United States Patent [19]

Shibano

[11] Patent Number: 5,322,082
[45] Date of Patent: Jun. 21, 1994

[54] ULTRASONIC CLEANING APPARATUS

[76] Inventor: Yoshihide Shibano, 1629-1-12, Oyama-cho, Machida-shi, Tokyo, Japan

[21] Appl. No.: 961,644

[22] Filed: Oct. 16, 1992

[51] Int. Cl.⁵ .............................................. B08B 3/12
[52] U.S. Cl. ..................................... 134/186; 96/198
[58] Field of Search ................. 55/183, 189, 192, 193; 134/184, 186

[56] References Cited

U.S. PATENT DOCUMENTS

| | | | |
|---|---|---|---|
| 1,598,787 | 9/1926 | Shields et al. | 55/193 |
| 2,064,650 | 12/1936 | Emanueli | 55/193 X |
| 2,977,962 | 4/1961 | Zucker | |
| 3,347,023 | 10/1967 | Scott | 55/193 |
| 4,193,818 | 9/1980 | Young et al. | 134/1 |
| 4,469,495 | 9/1984 | Hiraizumi et al. | 55/189 |
| 4,629,475 | 12/1986 | McArdle et al. | 55/193 X |
| 4,781,797 | 11/1988 | Johnson | 55/189 X |
| 4,865,060 | 9/1989 | Shibano | 134/60 |
| 4,907,611 | 3/1990 | Shibano | 134/184 X |
| 5,186,389 | 2/1993 | Shibano | 239/102.2 |

FOREIGN PATENT DOCUMENTS 2-233190 9/1990 Japan.
2192348 1/1988 United Kingdom.

Primary Examiner—Philip R. Coe
Attorney, Agent, or Firm—Paul A. Guss

[57] ABSTRACT

A workpiece is immersed in a cleaning solution in a cleaning tank. The cleaning tank has an ultrasonic vibrator disposed on its bottom for radiating ultrasonic energy into the cleaning solution to remove foreign matter or burrs off the workpiece. A deaerating device is connected to the cleaning tank for supplying a deaerated cleaning solution to the cleaning tank. The deaerating device comprises a sealed tank for being supplied with the cleaning solution from the cleaning tank. A vacuum pump or ejector is connected to the sealed tank to evacuate the sealed tank to release a dissolved gas from the cleaning solution which is supplied to the sealed tank and exposed to an evacuated space in the sealed tank.

10 Claims, 5 Drawing Sheets

ULTRASONIC CLEANING APPARATUS

BACKGROUND OF THE INVENTION

1. Field of the Invention

The present invention relates to an apparatus for ultrasonically cleaning a workpiece, and more particularly to an ultrasonic cleaning apparatus having an ultrasonic vibrator mounted on the bottom of a cleaning tank for radiating ultrasonic energy into a cleaning solution supplied to the cleaning tank to remove foreign matter or burrs off a workpiece immersed in the cleaning solution. More specifically, the present invention is concerned with an ultrasonic cleaning apparatus having a deaerating device for deaerating a cleaning solution to supply a deaerated cleaning solution to a cleaning tank.

2. Description of the Prior Art

Heretofore, there are known ultrasonic cleaning apparatus having a cleaning tank with an ultrasonic vibrator mounted on its bottom. After the cleaning tank has been supplied with a cleaning solution, an ultrasonic energy is radiated from the ultrasonic vibrator into the ultrasonic solution to clean a workpiece immersed in the cleaning solution. When the ultrasonic energy is radiated from the ultrasonic vibrator into the cleaning solution, the cleaning solution is cavitated, and the workpiece is exposed to shock waves or microjets that are produced when the cavitation is collapsed. Foreign matter or burrs can be removed from the workpiece by those shock waves or microjets. For efficiently cleaning workpiece, it is necessary to provide conditions which facilitate the generation of cavitation in the cleaning solution. It is known that the cleaning solution can be cavitated more easily if the concentration of gas dissolved in the cleaning solution is lower. If the concentration of gas dissolved in the cleaning solution is too high, then the dissolved gas is converted into bubbles by the ultrasonic energy radiated by the ultrasonic vibrator, and the cleaning solution becomes less cavitated as the ultrasonic energy is absorbed by the bubbles.

It is important, therefore, to control the amount of a gas dissolved in the cleaning solution. There have been proposed various deaerating devices for supplying a deaerated cleaning solution to the cleaning tank. One known deaerating device has a boiling tank for boiling the cleaning solution to release any dissolved gas from the cleaning solution. In another conventional deaerating device, a high-temperature layer is produced in a deaerated cleaning solution in the vicinity of its surface in the cleaning tank, thus generating a low-temperature layer below the high-temperature layer. Because air is dissolved into the cleaning solution at different rates at different solution temperatures, the high-temperature layer is effective to prevent air from being dissolved into the cleaning solution, thereby keeping the cleaning solution deaerated in the low-temperature layer. Still another prior deaerating device has a hollow fibrous gas separating membrane module. While a cleaning solution is flowing through the hollow fibrous membranes, the pressure outside the hollow fibrous membranes is lowered to draw any dissolved gas from the cleaning solution out of the hollow fibrous membranes, thus deaerating the cleaning solution.

However, the known deaerating devices suffer from various problems.

Specifically, the deaerating device with the boiling tank is relatively large in size and takes a long period of time to deaerate the cleaning solution. This type of deaerating device is not practical as the deaerating accuracy is not high.

The deaerating device which forms high-and low-temperature layers in the cleaning solution is not suitable for use with cleaning solutions that contain a solvent having a low boiling point because of the high-temperature layer that must be generated.

The deaerating device with the gas separating membrane module is disadvantageous in that the hollow fibrous membranes are expensive and open to attack by certain solvents such as higher alcohols. Therefore, the deaerating device of this type can use only a limited range of cleaning solutions. Furthermore, the effectiveness of the hollow fibrous membranes is lowered quickly when oily substances are attached to the hollow fibrous membranes or biological membranes are deposited thereon due to the growth of microorganisms.

SUMMARY OF THE INVENTION

It is an object of the present invention to provide an ultrasonic cleaning apparatus with a deaerating device that is relatively small in size, inexpensive, can be used with various different cleaning solutions, and can deaerate a cleaning solution accurately within a short period of time.

To achieve the above object, there is provided in accordance with the present invention an apparatus for ultrasonically cleaning a workpiece, comprising a cleaning tank for storing a cleaning solution therein, the cleaning tank having an ultrasonic vibrator disposed on a bottom thereof for radiating an ultrasonic energy into the cleaning solution to remove foreign matter or burrs off a workpiece immersed in the cleaning solution, and deaerating means connected to the cleaning tank for supplying a deaerated cleaning solution to the cleaning tank, the deaerating means comprising a sealed tank which is supplied with the cleaning solution from the cleaning tank, and evacuating means for evacuating the sealed tank to release a dissolved gas from the cleaning solution supplied to the sealed tank and exposed to an evacuated space in the sealed tank.

When the cleaning solution introduced into the sealed tank is brought into contact with the evacuated space in the sealed tank, the dissolved gas is released from the cleaning solution, i.e., the cleaning solution becomes deaerated. Accordingly, the cleaning solution can be deaerated highly accurately in a short period of time without using an expensive gas separating membrane module, and the ultrasonic cleaning apparatus may be relatively small in size. The ultrasonic cleaning apparatus may use any cleaning solution as it has no gas separating membrane module therein, and further because it does not involve the generation of a high-temperature layer in the cleaning solution.

The deaerating means may include means for discharging air from the sealed tank to evacuate the sealed tank. Such means may comprise a vacuum pump or an ejector with a valve vented to atmosphere, for example.

The evacuating means may be connected to an upper portion of the sealed tank, and the apparatus may further include means for supplying the cleaning solution to the sealed tank through a bottom thereof, whereby the cleaning solution is exposed to the evacuated space in the upper portion of the sealed tank. As the cleaning solution is introduced into and accumulated in the sealed tank, the space in the upper portion of the sealed tank is reduced, and is evacuated by the evacuating means connected to the upper portion of the sealed tank. Therefore, a high vacuum can be developed in a short period of time, causing the dissolved gas to be easily released from the cleaning solution into the space in the upper portion of the sealed tank.

The deaerating means may include an ultrasonic vibrator mounted on the bottom of the sealed tank for radiating ultrasonic energy into the cleaning solution in the sealed tank. The ultrasonic energy radiated from the ultrasonic vibrator into the cleaning solution accelerates the release of the dissolved gas from the cleaning solution. The ultrasonic energy radiated by the ultrasonic vibrator has a frequency which may range from 25 kHz to 1.9 MHz, preferably from 1.0 MHz to 1.9 MHz. If the frequency of the ultrasonic energy is lower than 25 kHz, then it produces an uncomfortable noise. Any ultrasonic vibrator capable of radiating an ultrasonic energy at a frequency higher than 1.9 MHz is not available at present.

The deaerating means may introduce the cleaning solution downwardly into the sealed tank from an upper portion thereof, whereby the cleaning solution is exposed to the evacuated space in the sealed tank while flowing downwardly through the sealed tank. While the cleaning solution is flowing from the upper portion of the sealed tank downwardly through the sealed tank, the cleaning solution is exposed to the evacuated space in the sealed tank through an increased area of contact. Therefore, any dissolved gas can easily be discharged from the cleaning solution.

The evacuating means may include a discharge pipe extending vertically in the sealed tank and having a plurality of holes defined in a wall thereof, and means disposed outside of the sealed tank and connected to the discharge pipe, for discharging air from the sealed tank, the discharge pipe having means for preventing the cleaning solution from being drawn into the discharge pipe through the holes. The evacuating means can uniformly evacuate the sealed tank by discharging air from the sealed tank, and the cleaning solution flows downwardly through the sealed tank without being drawn by the evacuating means.

The means for preventing the cleaning solution from being drawn into the discharge pipe may comprise a plurality of covers attached to the discharge pipe in overhanging relationship to the holes, respectively. Since the cleaning solution flows along the covers, it is effectively prevented from being drawn into the evacuating means. Air in the sealed pipe is drawn into the holes through gaps defined between the discharge pipe and distal ends of the covers. Therefore, the covers do not obstruct the discharge of air from the sealed tank.

The evacuating means may include means in the sealed tank for exposing the cleaning solution which is introduced downwardly into the sealed tank to the evacuated space therein through an increased area of contact. Since the cleaning solution is exposed to the evacuated space through an increased area of contact, the cleaning solution can be deaerated highly efficiently.

The means in the sealed tank for exposing the cleaning solution to the evacuated space may comprise a plurality of vertically spaced partitions dividing the space in the sealed tank into a plurality of chambers, each of the partitions having a plurality of small holes. Upon downward flow of the cleaning solution in the sealed tank, the cleaning solution is dispersed each time it reaches one of the partitions, and hence is exposed to the space in the sealed tank through an increased area of contact.

The means in the sealed tank for exposing the cleaning solution to the evacuated space may also comprise a filler for allowing the cleaning solution to flow on a surface thereof. While the cleaning solution is flowing downwardly along the surface of the filler in the sealed tank, the cleaning solution is exposed to the space in the sealed tank through an increased area of contact. With the filler used, the cleaning solution remains exposed to the space in the sealed tank for a period of time longer than if it were dispersed only by the small holes in the partitions. Thus, the cleaning solution can be deaerated highly efficiently. The filler may preferably be in the form of a spirally wound net of SUS or plastic, as it is inexpensive, and any oily or biological deposits can easily be washed away for reusing the filler.

The means in the sealed tank for exposing the cleaning solution to the evacuated space may comprise both a plurality of vertically spaced partitions dividing the space in the sealed tank into a plurality of chambers, each of the partitions having a plurality of small holes, and a filler disposed in the chambers for allowing the cleaning solution to flow on a surface thereof. Both the partitions and the filler jointly operate to expose the cleaning solution to the evacuated space in the sealed tank through an increased area of contact. The spaced partitions in the sealed tank also serve to stiffen the sealed tank. Accordingly, even when the sealed tank is evacuated, the sealed tank is protected from deformation.

The cleaning tank has an outlet port for discharging the cleaning solution from the cleaning tank and an inlet port for supplying the cleaning solution into the cleaning tank, further including circulating means for circulating the cleaning solution from the outlet port to the inlet port, the deaerating means being connected in the circulating means. Since the cleaning solution is circulated for deaeration, the cleaning solution can be reused and hence may be consumed in a relatively small amount.

The deaerating means may include debubbling means for eliminating bubbles produced in the sealed tank when the dissolved gas is released from the cleaning solution, the debubbling means being positioned in a portion of the sealed tank where the bubbles are produced. Since the bubbles are eliminated in the sealed tank, they are prevented from being drawn into the evacuating means. The debubbling means may comprise an ultrasonic vibrator disposed in an upper portion of the sealed tank for applying an ultrasonic energy to the bubbles produced from the cleaning solution.

The debubbling means may be connected between the sealed tank and the means for discharging air. With such an arrangement, inasmuch as the bubbles are eliminated before they reach the evacuating means, they are prevented from being drawn into the evacuating means. The debubbling means may comprise a solid debubblizer which can eliminate the bubbles upon contact therewith, the solid debubblizer being shaped so not to obstruct the passage of a gas therethrough. The solid debubblizer may be a silicone-base solid debubblizer.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
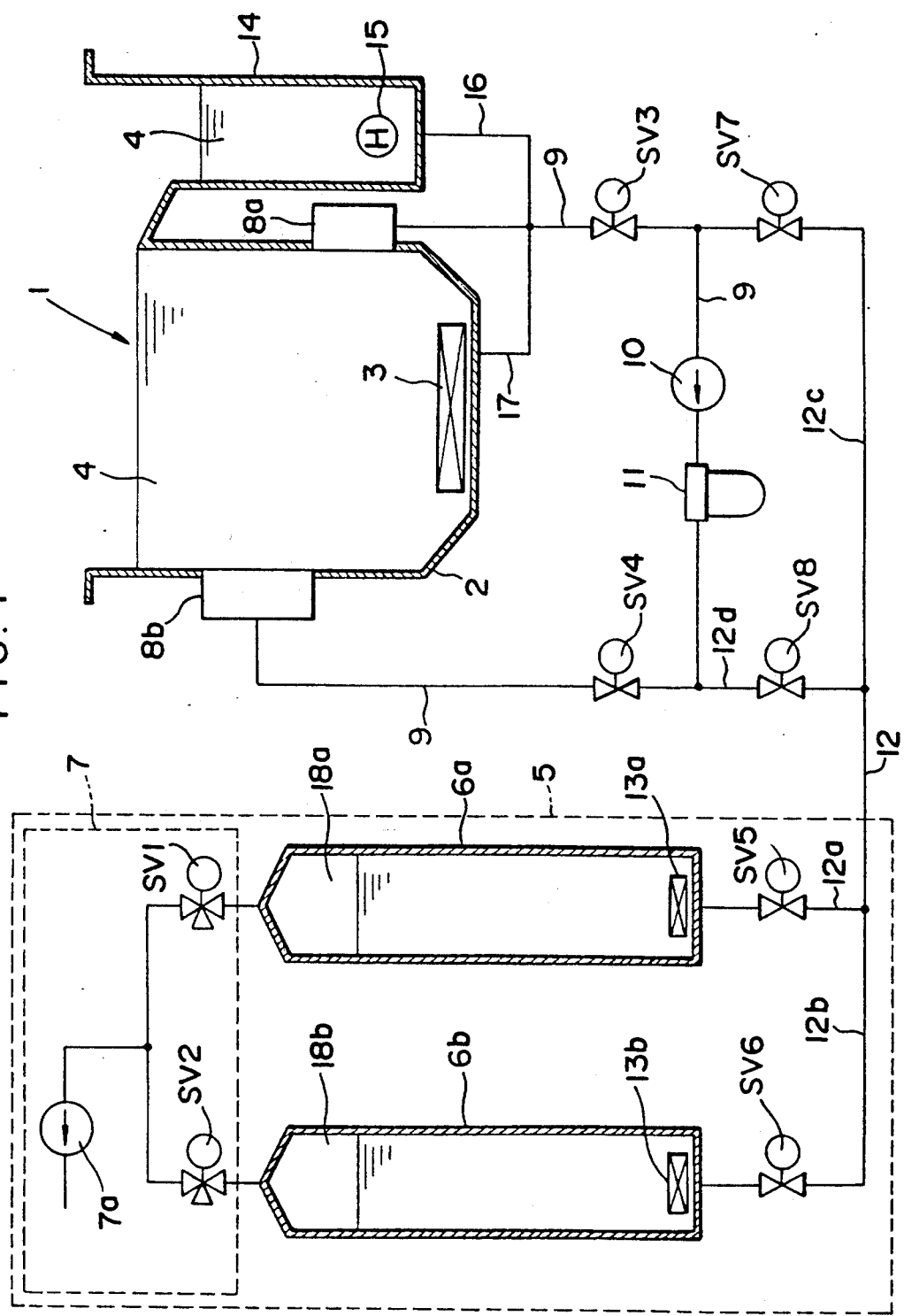
FIG. 1 is a schematic view of an ultrasonic cleaning apparatus according to an embodiment of the present invention.

As shown in FIG. 1, an ultrasonic cleaning apparatus, generally designated by the reference numeral 1, according to an embodiment of the present invention has an ultrasonic cleaning tank 2 with an ultrasonic vibrator 3 mounted on its bottom. A workpiece to be cleaned is immersed in a cleaning solution 4 supplied to the cleaning tank 2, and ultrasonic energy is radiated from the ultrasonic vibrator 3 into the cleaning solution 4 to remove foreign matter or burrs off the workpiece.

A deaerating device 5 for deaerating the cleaning solution 4 before it is supplied to the cleaning tank 2 is disposed outside of the cleaning tank 2. The deaerating device 5 comprises sealed tanks 6a, 6b for hermetically and sealing storing the cleaning solution 4 therein, and an evacuating unit 7 for evacuating the sealing tanks 6a, 6b. The evacuating unit 7 has a vacuum pump 7a for drawing air from the sealing tanks 6a, 6b to evacuate them, and two three-way solenoid-operated valves SV1, SV2 through which the vacuum pump 7a is connected to upper ends of the sealing tanks 6a, 6b.

The cleaning tank 2 has an outlet port 8a in its side wall for discharging the cleaning solution 4 from the cleaning tank 2, and an inlet port 8b in its side wall for supplying the cleaning solution 4 into the cleaning tank 2, the outlet and inlet ports 8a, 8b being positioned in diametrically confronting relationship to each other. The outlet and inlet ports 8a, 8b are connected to each other through a circulation conduit 9. The circulation conduit 9 has a circulation pump 10 for circulating the cleaning solution 4 from the outlet port 8a to the inlet port 8b, and a filter 11 disposed downstream of the circulation pump 10 for filtering out foreign matter or burrs from the cleaning solution 4. The circulation conduit 9 also has a solenoid-operated valve SV3 disposed upstream of the circulation pump 10 and a solenoid-operated valve SV4 disposed downstream of the filter 11. Flow rectifying units (not shown) are disposed in the respective outlet and inlet ports 8a, 8b for preventing air from being trapped in the cleaning solution 4.

Supply conduits 12a, 12b for introducing the cleaning solution 4 into the sealed tanks 6a, 6b are connected to the bottoms of the sealed tanks 6a, 6b, respectively, through respective solenoid-operated valves SV5, SV6. The supply conduits 12a, 12b are joined into a single supply conduit 12 upstream of the sealing tanks 6a, 6b. The supply conduit 12 is divided into two conduits 12c, 12d upstream of the supply conduits 12a, 12b. The conduit 12c is connected through a solenoid-operated valve SV7 to the circulation conduit 9 at a position between the circulation pump 10 and the solenoid-operated valve SV3. The conduit 12d is connected through a solenoid-operated valve SV8 to the circulation conduit 9 at a position between the filter 11 and the solenoid-operated valve SV4.

Ultrasonic vibrators 13a, 13b are mounted on the respective bottoms of the sealing tanks 6a, 6b for radiating an ultrasonic energy into the cleaning solution 4 in the sealing tanks 6a, 6b.

A reserve tank 14 is positioned adjacent to the cleaning tank 2 for receiving an overflow of cleaning solution from the cleaning tank 2 and storing a reserve cleaning solution 4. The reserve tank 14 houses a heater 15 for keeping the cleaning solution 4 at a constant temperature. The volume of the reserve tank 14 is greater than the sum of the volumes of the sealed tanks 6a, 6b. The reserve tank 14 is connected to the circulation conduit 9 through a conduit 16 joined to the bottom of the reserve tank 14. The cleaning tank 2 is connected to the circulation conduit 9 through a conduit 17 joined to the bottom of the cleaning tank 14.

The ultrasonic cleaning apparatus shown in FIG. 1 operates as follows:

First, the cleaning tank 2 is filled with the cleaning solution 4 which is deaerated, and then the circulation pump 10 is actuated to circulate the cleaning solution 4 from the outlet port 8a to the inlet port 8b. At the same time, the ultrasonic vibrator 3 is energized to radiate an ultrasonic energy into the cleaning solution 4. A workpiece with foreign matter or burrs attached to its surface is immersed in the deaerated cleaning solution 4 in the cleaning tank 2. The foreign matter or burrs attached to the workpiece are now removed by cavitation which is generated in the cleaning solution by the ultrasonic energy radiated from the ultrasonic vibrator 3.

After the workpiece has been cleaned, it is lifted out of the cleaning solution 4, and then another workpiece to be cleaned is immersed in the cleaning solution 4. When the above process is repeated to clean a number of workpieces, the removed foreign matter or burrs are accumulated in the cleaning solution 4, and air is dissolved into the cleaning solution 4. Since the amount of air dissolved in the cleaning solution 4 is increased, the cleaning solution 4 becomes less liable to be cavitated.

In the illustrated ultrasonic cleaning apparatus, while the cleaning solution 4 is being circulated from the outlet port 8a to the inlet port 8b, the foreign matter or burrs in the cleaning solution 4 are removed by the filter 11, and the cleaning solution 4 is introduced into the sealed tanks 6a, 6b from the circulation conduit 9 through the supply conduits 12a, 12b. The cleaning solution 4 is then deaerated in the sealed tanks 6a, 6b.

More specifically, the cleaning solution 4 is deaerated by the deaerating device 5 as follows:

Normally, only the solenoid-operated valves SV3, SV4 are open, and the solenoid-operated valves SV5, SV6, SV7, SV8 are closed, allowing the cleaning solution 4 to circulate from the outlet port 8a to the inlet port 8b. To deaerate the cleaning solution 4, the solenoid-operated valves SV4 is closed, and the solenoid-operated valves SV5, SV8 are opened. The three-way solenoid-operated valve SV1 is vented to atmosphere. Since only the solenoid-operated valves SV3, SV8, SV5 are open, the cleaning solution 4 is introduced into the sealed tank 6a through the circulation conduit 9 and the supply conduits 12d, 12a.

Then, when the cleaning solution 4 is supplied up to a certain level in the sealed tank 6a, the solenoid-operated valves SV5, SV8 are closed, and the solenoid-operated valve SV4 is opened. The cleaning solution 4 is now circulated from the outlet port 8a to the inlet port 8b.

Thereafter, the three-way solenoid-operated valve SV1 is opened into communication with the vacuum pump 7a, and the vacuum pump 7a is actuated. An upper space 18a in the sealed tank 6a, above the level of the cleaning solution 4 therein, is evacuated by the vacuum pump 7a, developing a high vacuum. As a result, the cleaning solution 4 is exposed to the evacuated upper space 18a, and a dissolved gas contained in the cleaning solution 4 is discharged into the upper space 18a. At this time, the ultrasonic vibrator 13a is actuated to radiate an ultrasonic energy into the cleaning solution 4 in the sealed tank 6a. When the ultrasonic energy is radiated into the cleaning solution 4, the dissolved gas can easily be discharged into the upper space 18a.

When different ultrasonic energies were applied to 70 liters of the cleaning solution 4, the cleaning solution 4 was deaerated by the ultrasonic energies as follows:

|  | Ultrasonic energy | | | | | |
| --- | --- | --- | --- | --- | --- | --- |
|  | Not applied | | Applied at 28 kHz | | Applied at 1.4 MHz | |
| Time required (m) | 20 | 40 | 20 | 40 | 20 | 40 |
| Dissolved oxygen concentration (ppm) | 2.2 | 1.8 | 1.5 | 0.7 | 0.8 | 0.4 |

It can be seen from the above table that the ultrasonic energy radiated into the cleaning solution 4 by the ultrasonic vibrators 13a, 13b in the sealed tanks 6a, 6b is effective to shorten the time required to deaerate the cleaning solution 4 and also to lower the dissolved oxygen concentration, because the ultrasonic energy can accelerate the evaporation and release of the dissolved gas from the cleaning solution 4.

The ultrasonic energy radiated from the ultrasonic vibrators 13a, 13b may have a frequency ranging from 25 kHz to 1.9 MHz, preferably ranging from 1.0 MHz to 1.9 MHz. If the frequency of the ultrasonic energy is lower than 25 kHz, then it produces an uncomfortable noise. The ultrasonic energy may be effective if its frequency is higher than 1.9 MHz, but an ultrasonic vibrator capable of radiating ultrasonic energy at a frequency higher than 1.9 MHz is not available at present.

Under normal conditions, the gas that is dissolved in the cleaning solution 4 is air. Since the composition of air is constant, the concentration of dissolved gas is represented by the dissolved oxygen concentration in the above table.

A predetermined period of time after the above deaerating process has started, the solenoid-operated valve SV4 is closed, and the solenoid-operated valves SV6, SV8 are opened. The three-way solenoid-operated valve SV2 is vented to atmosphere. Since only the solenoid-operated valves sv3, sv8, sv6 are open, the cleaning solution 4 is introduced into the sealed tank 6b through the circulation conduit 9 and the supply conduits 12d, 12b.

Then, when the cleaning solution 4 is supplied up to a certain level in the sealed tank 6b, the solenoid-operated valves SV6, SV8 are closed, and the solenoid-operated valve SV4 is opened. The cleaning solution 4 is now circulated from the outlet port 8a to the inlet port 8b.

Thereafter, the three-way solenoid-operated valve SV2 is opened into communication with the vacuum pump 7a, and the vacuum pump 7a is actuated. An upper space 18b in the sealed tank 6b is evacuated to deaerate the cleaning solution 4 in the sealed tank 6b. At the same time, the ultrasonic vibrator 13b is actuated to release the dissolved gas into the upper space 18b at an accelerated rate.

After the cleaning solution 4 in the sealed tank 6a has been deaerated, the solenoid-operated valves SV3, SV8 are closed, the solenoid-operated valves SV5, SV7 are opened, and the three-way solenoid-operated valve SV1 is vented to atmosphere. The cleaning solution 4 is now drawn out of the sealed tank 6a by the circulation pump 10, and flows through the supply conduits 12a, 12c and the circulation conduit 9 back into the cleaning tank 2 from the inlet port 8b.

When the cleaning solution 4 is removed from the sealed tank 6a, the solenoid-operated valves SV5, SV7 are closed, and the solenoid-operated valve SV3 is opened to allow the cleaning solution 4 to circulate from the outlet port 8a to the inlet port 8b. Upon completion of the deaerating process in the other sealed tank 6b, the vacuum pump 7a is inactivated, the solenoid-operated valve SV3 is closed, the solenoid-operated valves SV6, SV7 are opened, and the three-way solenoid-operated valve SV2 is vented to atmosphere. The deaerated cleaning solution 4 now returns from the sealed tank 6b to the cleaning tank 2. Thereafter, the solenoid-operated valves SV6, SV7 are closed, and the solenoid-operated valve SV3 is opened, permitting the cleaning solution 4 to circulate from the outlet port 8a to the inlet port 8b.

In the above embodiment, the cleaning solution 4 may be deaerated continuously or intermittently depending on the amount of gas dissolved in the cleaning solution 4, so that the amount of dissolved gas may be controlled to achieve a concentration best suited to cavitate the cleaning solution 4. The deaerating process may be automatically carried out by programming the operation of the solenoid-operated valves SV1 through SV8. Since the process of ultrasonically cleaning workpieces can be continued while the cleaning solution 4 is being deaerated, the workpieces may be cleaned uniformly. While only two sealed tanks 6a, 6b are illustrated in FIG. 1, more sealed tanks may be employed for deaerating the cleaning solution 4 more efficiently.

Figure 2:
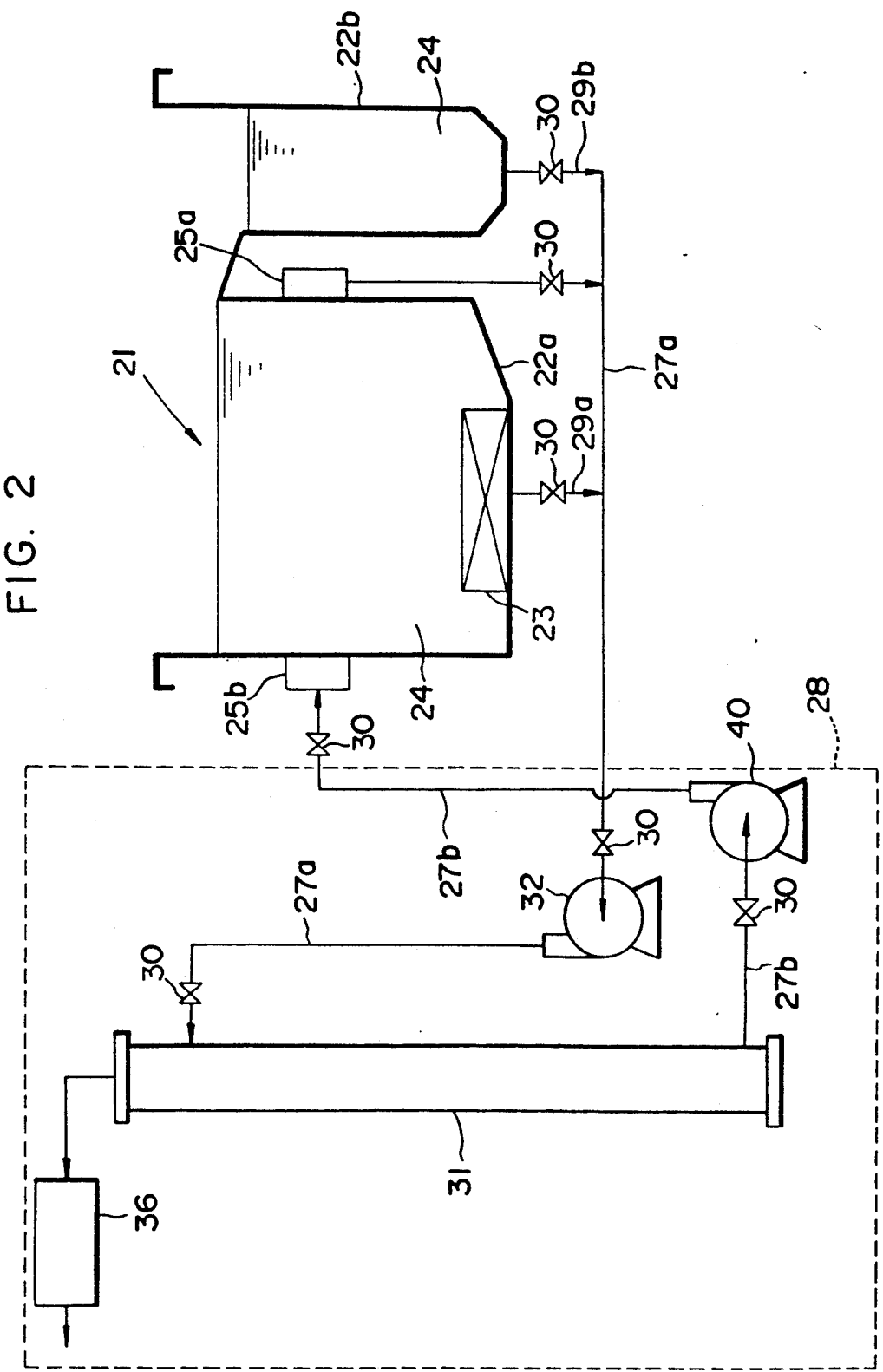
FIG. 2 is a schematic view of an ultrasonic cleaning apparatus according to another embodiment of the present invention.

FIG. 2 schematically shows an ultrasonic cleaning apparatus according to another embodiment of the present invention.

As shown in FIG. 2, the ultrasonic cleaning apparatus, generally designated by the reference numeral 21, has an ultrasonic cleaning tank 22a with an ultrasonic vibrator 23 mounted on its bottom. A workpiece to be cleaned is immersed in a cleaning solution 24 supplied to the cleaning tank 22a, and ultrasonic energy is radiated from the ultrasonic vibrator 23 into the cleaning solution 24 to remove foreign matter or burrs off the workpiece. The ultrasonic cleaning apparatus 21 employs tap water containing 10% of a nonionic surface active agent detergent as the cleaning solution 4

The cleaning tank 22a has an outlet port 25a in its side wall for discharging the cleaning solution 24 from the cleaning tank 22a, and an inlet port 25b in its side wall for supplying the cleaning solution 24 into the cleaning tank 22a, the outlet and inlet ports 25a, 25b being positioned in diametrically confronting relationship to each other. Flow rectifying units (not shown) are disposed in the respective outlet and inlet ports 25a, 25b for preventing air from being trapped in the cleaning solution 24.

A deaerating device 28 for deaerating the cleaning solution 24 before it is supplied to the cleaning tank 22a is disposed outside of the cleaning tank 22a. The deaerating device 28 is connected to the outlet port 25a through a supply conduit 27a and also to the inlet port 25b through a supply conduit 27b.

The supply conduits 27a, 27b jointly serve as a circulation system which includes the deaerating device 28.

Figure 3:
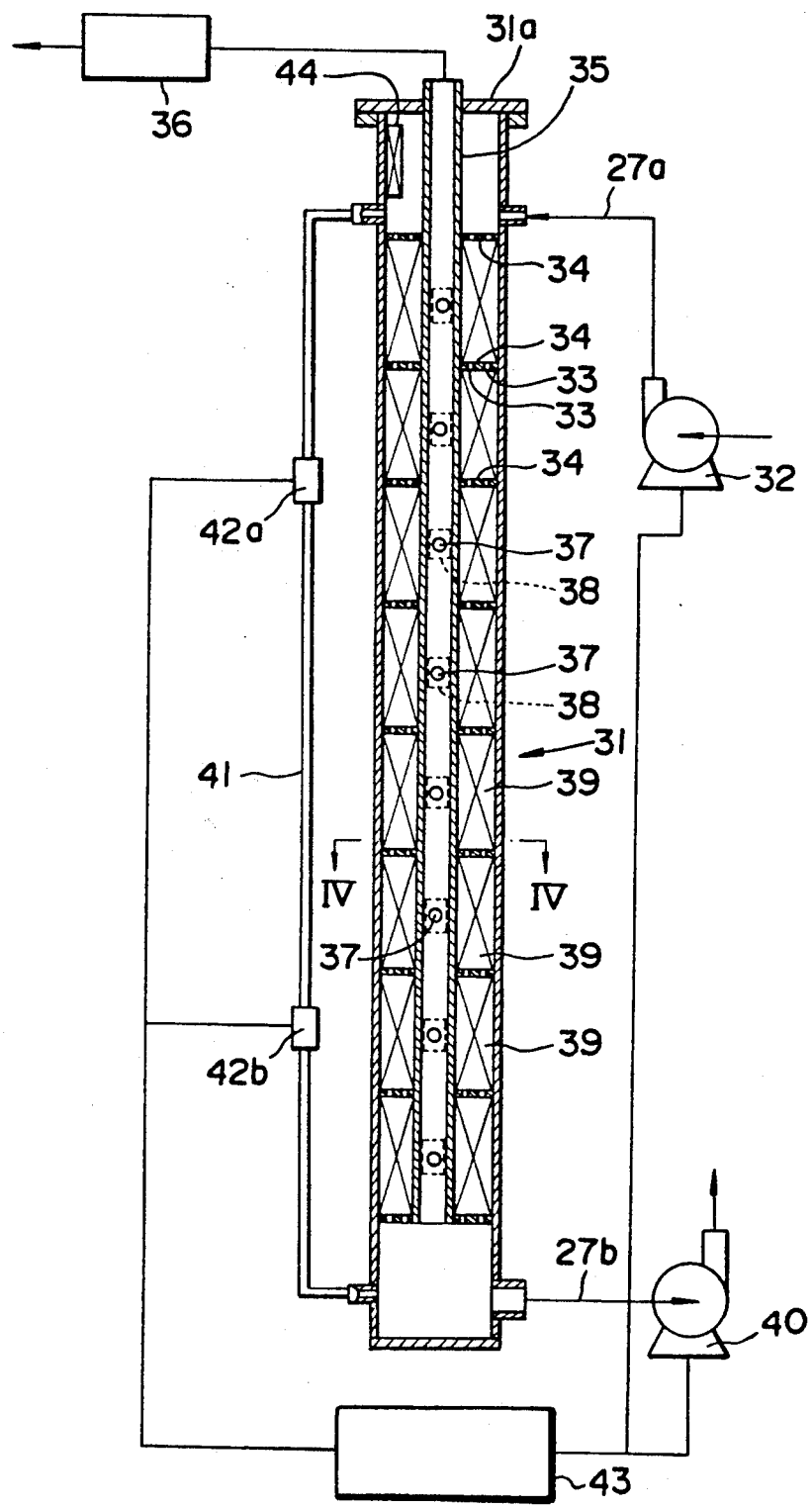
FIG. 3 is a cross-sectional view of a deaerating device of the ultrasonic cleaning apparatus shown in FIG. 2.

The deaerating device 28 will be described in detail below with reference to FIG. 3. FIG. 3 shows the deaerating device 28 in cross section.

As shown in FIG. 3, the deaerating device 28 has a sealed tank 31 in the form of a pipe of SUS whose opposite ends are hermetically closed. The supply conduit 27a is connected to an upper side wall of the sealed tank 31 for supplying the cleaning solution 24, which is to be deaerated, into the sealed tank 31. A supply pump 32 is connected in the supply conduit 27a. The supply pump 32 and the supply conduit 27a jointly serve to introduce the cleaning solution 24, to be deaerated, through the supply conduit 27a into the sealed tank 31.

The sealed tank 31 houses a plurality of axially spaced partitions 34 which divide the interior space of the sealed tank 31 into a vertical array of chambers, each of the partitions 34 having a number of small holes 33 defined therein. The partitions 34 serve to increase the area of contact between the cleaning solution 24 and the space in the sealed tank 31. When the cleaning solution 24 is introduced into the sealed tank 31 through the supply conduit 27a by the supply pump 32, the cleaning solution 24 flows through the small holes 33 in the partitions 34 downwardly in the sealed tank 31.

The sealed tank 31 can be evacuated by a discharge pipe 35 extending axially through an upper end cap 31a of the sealed tank 31 and the partitions 34 and hence vertically in the sealed tank 31, and an ejector 36 disposed outside of the sealed tank 31 and connected to the discharge pipe 35. The ejector 36 serves to discharge air from the discharge pipe 35, and has a valve (not shown) vented to atmosphere.

The discharge pipe 35 has a plurality of holes 37 defined in its pipe wall at axially spaced intervals. The discharge pipe 35 also has a plurality of covers 38 attached to its outer surface in covering relationship to the respective holes 37 for preventing the downwardly flowing cleaning solution 24 from being drawn into the holes 37.

A filler 39 is filled in the sealed tank 31 around the discharge pipe 35 in spaces between the partitions 34. The filler 39 is also effective to increase the area of contact between the cleaning solution 24 and the space in the sealed tank 31. The filler 39 may be of any material and structure insofar as the cleaning solution 24 can flow along the surface of the filler 39. For example, a spirally wound net of SUS or plastic is preferable as it is inexpensive and any oily or biological deposits can easily be washed away for reusing the filler 39.

The supply conduit 27b is connected to a lower side wall of the sealed tank 31 near the bottom thereof. A supply pump 40 is connected in the supply conduit 27b. The supply pump 40 and the supply conduit 27b jointly serve to deliver the deaerated cleaning solution 24 through the supply conduit 27b to the cleaning tank 222a.

A communication pipe 41 interconnecting upper and lower spaces in the sealed tank 31 is disposed outside of and extends along the sealed tank 31. The supply conduits 27a, 27b open respectively into the upper and lower spaces that are interconnected by the communication pipe 41. The communication pipe 41 has two spaced level switches 42a, 42b of the electrostatic capacitance type for detecting the solution level in the sealed tank 31 with floats that vertically move in unison with the solution level in the sealed tank 31. These level switches 42a, 42b are electrically connected to a deaeration controller 43. The deaeration controller 43 is electrically connected to the supply pumps 32, 40. When a predetermined upper limit position for the solution level in the sealed tank 31 is detected by the level switch 42a, the deaeration controller 43 inactivates the supply pump 32 and activates the supply pump 40 to discharge the deaerated cleaning solution 24 from the sealed tank 31 and supply it through the supply conduit 27b to the cleaning stank 22a. When a predetermined low limit position for the solution level in the sealed tank 31 is detected by the level switch 42b, the deaeration controller 43 inactivates the supply pump 40 and activates the supply pump 32 to introduce the cleaning solution 24, to be deaerated, into the sealed tank 31.

An ultrasonic vibrator 44 is attached to an upper wall surface of the sealed tank 31 for eliminating bubbles which may be produced when a dissolved gas is discharged, particularly if the cleaning solution 24 contains a detergent such as a surface active agent.

As shown in FIG. 2, a reserve tank 22b is positioned adjacent to the cleaning tank 22a for receiving an overflow of cleaning solution from the cleaning tank 22a when a workpiece is immersed in the cleaning solution 24 in the cleaning tank 22a. Discharge conduits 29a, 29b are connected to the bottoms, respectively, of the cleaning tank 22a and the reserve tank 22b. The discharge conduits 29a, 29b are connected to the supply conduit 27a upstream of the supply pump 32.

The conduits 27a, 27b, 29a, 29b have flow regulating valves for regulating the rates of the cleaning solution 24 flowing therethrough.

Operation of the ultrasonic cleaning apparatus 21 will be described below.

The deaerated cleaning solution 24 is filled in the cleaning tank 22a, and the ultrasonic vibrator 23 is actuated to remove foreign matter or burrs from a workpiece which is immersed in the cleaning solution 24 in the cleaning tank 22a. Since repetition of the cleaning process results in an increase in the amount of dissolved gas in the cleaning solution 24, the cleaning solution 24 is supplied through the supply conduit 27a to the sealed tank 31 by the supply pump 32. After the cleaning solution 24 has been deaerated in the sealed tank 32, it is discharged from the sealed tank 32 by the supply pump 40, and returned through the supply conduit 27b to the cleaning tank 22a.

The deaerating device 28 deaerates the cleaning solution 24 as follows:

The cleaning solution 24 drawn from the cleaning tank 22a is introduced into the sealed tank 31 through the supply conduit 27a by the supply pump 32. At this time, the sealed tank 31 has been evacuated through the discharge pipe 35 by the ejector 36. Inasmuch as the discharge pipe 35 extends vertically and the holes 33 are defined in its wall, the sealed tank 31 may be evacuated uniformly to a pressure level of about −650 mmHg.

The cleaning solution 24 supplied to the sealed tank 31 flows downwardly while being exposed to the evacuated space in the sealed tank 31. Therefore, any dissolved gas is released from the cleaning solution 24 while it is flowing downwardly through the discharge pipe 35.

The partitions 34 in the sealed tank 31 will be described below with reference to FIG. 4.

Figure 4:
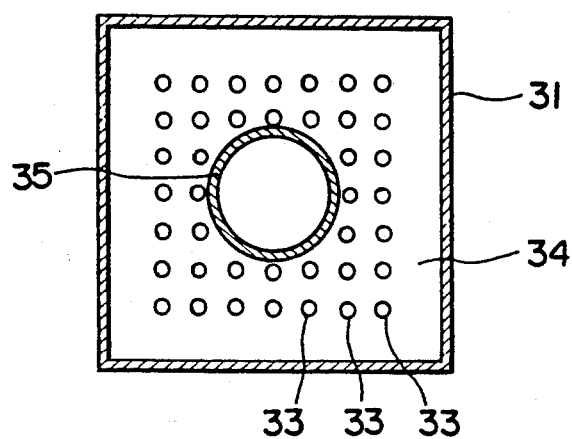
FIG. 4 is a cross-sectional view taken along line IV—IV of FIG. 3.

As shown in FIG. 4, the small holes 33 are defined in each of the partitions 34 around the discharge pipe 35. Therefore, the cleaning solution 24 introduced into the sealed tank 31 is dispersed by the small holes 33 while flowing down the sealed tank 31. The cleaning solution 24 is thus exposed to the space in the sealed tank 31 through a large area of contact, and the dissolved gas can efficiently be released from the cleaning solution 24. Inasmuch as the cleaning solution 24 also flows along the surface of the filler 39 filled between the partitions 34, the cleaning solution 24 is further exposed to the space in the sealed tank 31 through an increased area of contact. The cleaning solution 24 is exposed to the space in the sealed tank for a longer period of time than would be if it were not for the filler 39. Consequently, the dissolved gas is discharged from the cleaning solution 24 at an accelerated rate with a high deaeration efficiency.

The cleaning solution 24 flowing down the filler 39 is dispersed by the small holes 33 each time it reaches one of the partitions 34. The cleaning solution 24 is thus prevented from being localized in the sealed tank 31 so that the dissolved gas can be released from the cleaning solution 24 highly efficiently. The axially spaced partitions 34 in the sealed tank 31 also serve to stiffen the sealed tank 31. Accordingly, even when the sealed tank 31 is evacuated, the sealed tank 31 is protected from deformation.

The holes 37 in the discharge pipe 35 confront the filler 39, and might draw in the cleaning solution 24 which flows down the filler 39. However, the cleaning solution 24 is prevented from being drawn into the discharge pipe 35 by the covers 38 which cover the holes 37.

The covers 38 will be described in more detail with reference to FIG. 5.

Figure 5:
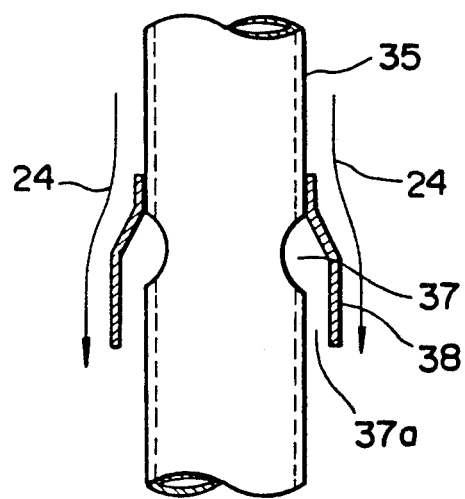
FIG. 5 is an enlarged fragmentary elevational view of a structure for preventing a cleaning solution from being drawn.

As illustrated in FIG. 5, the covers 38 are attached at upper ends thereof to the discharge pipe 35 and extend downwardly in overhanging relationship to the holes 37, leaving gaps 37a between the discharge pipe 35 and the lower ends of the covers 38. The gas in the sealed tank 31 is drawn into the discharge pipe 35 through the gaps 37a, whereas the cleaning solution 24 which flows downwardly is prevented by the covers 38 from being drawn into the discharge pipe 35.

The cleaning solution 24 thus deaerated is accumulated in the sealed tank 31, and its level gradually increases as more cleaning solution 24 is deaerated. When the level of the cleaning solution 24 increases in the sealed tank 31, it enters the discharge pipe 35, but is not drawn by the ejector 36.

Since the cleaning solution 24 contains a surface active agent, it may bubble violently as the dissolved gas is discharged, and bubbles fill up the sealed tank 31. Since these bubbles will not easily be eliminated automatically, they will move upwardly as the level of the cleaning solution 24 goes upwardly, and might eventually be drawn into the ejector 36. However, the bubbles can be eliminated by the ultrasonic energy radiated from the ultrasonic vibrator 44 mounted on the upper inner wall surface of the sealed tank 31.

When the level of the accumulated cleaning solution 24 in the sealed tank 31 reaches a predetermined upper limit position, the level switch 42a in the communication pipe 41 sends a detected signal to the deaeration controller 43. In response to the detected signal from the level switch 42a, the deaeration controller 43 inactivates the supply pipe 32 and actuates the supply pump 40. As a result, the deaerated cleaning solution 24 that is accumulated in the sealed tank 31 is supplied through the supply conduit 27b to the cleaning tank 22a by the supply pump 40.

When the deaerated cleaning solution 24 is thus supplied to the cleaning tank 22a, the level of the cleaning solution 24 in the sealed tank 31 descends and reaches a predetermined lower limit position. Then, the level switch 42b sends a detected signal to the deaeration controller 43, which stops the supply pump 40 and activates the supply pump 32. The cleaning solution 24, to be deaerated, is now introduced into the sealed tank 31 through the supply conduit 27a, and the deaerated cleaning solution 24 starts being accumulated in the sealed tank 31.

Consequently, each time a certain amount of deaerated cleaning solution 24 is accumulated in the sealed tank 31, it is automatically supplied to the cleaning tank 22a. When the supply of the deaerated cleaning solution 24 to the cleaning tank 22a is finished, the deaerated cleaning solution 24 automatically starts to be accumulated in the sealed tank 31. The level of the cleaning solution 24 in the sealed tank 31 is thus prevented from rising excessively into the ejector 36. The deaerated cleaning solution 24 can also be supplied efficiently to the cleaning tank 22a.

In this embodiment, only one deaerating device 28 is connected to the cleaning tank 22a. However, a plurality of deaerating devices 28 may be connected parallel to each other, and may be actuated one after another to supply the deaerated cleaning solution 24 without interruption to the cleaning tank 22a.

Figure 6:
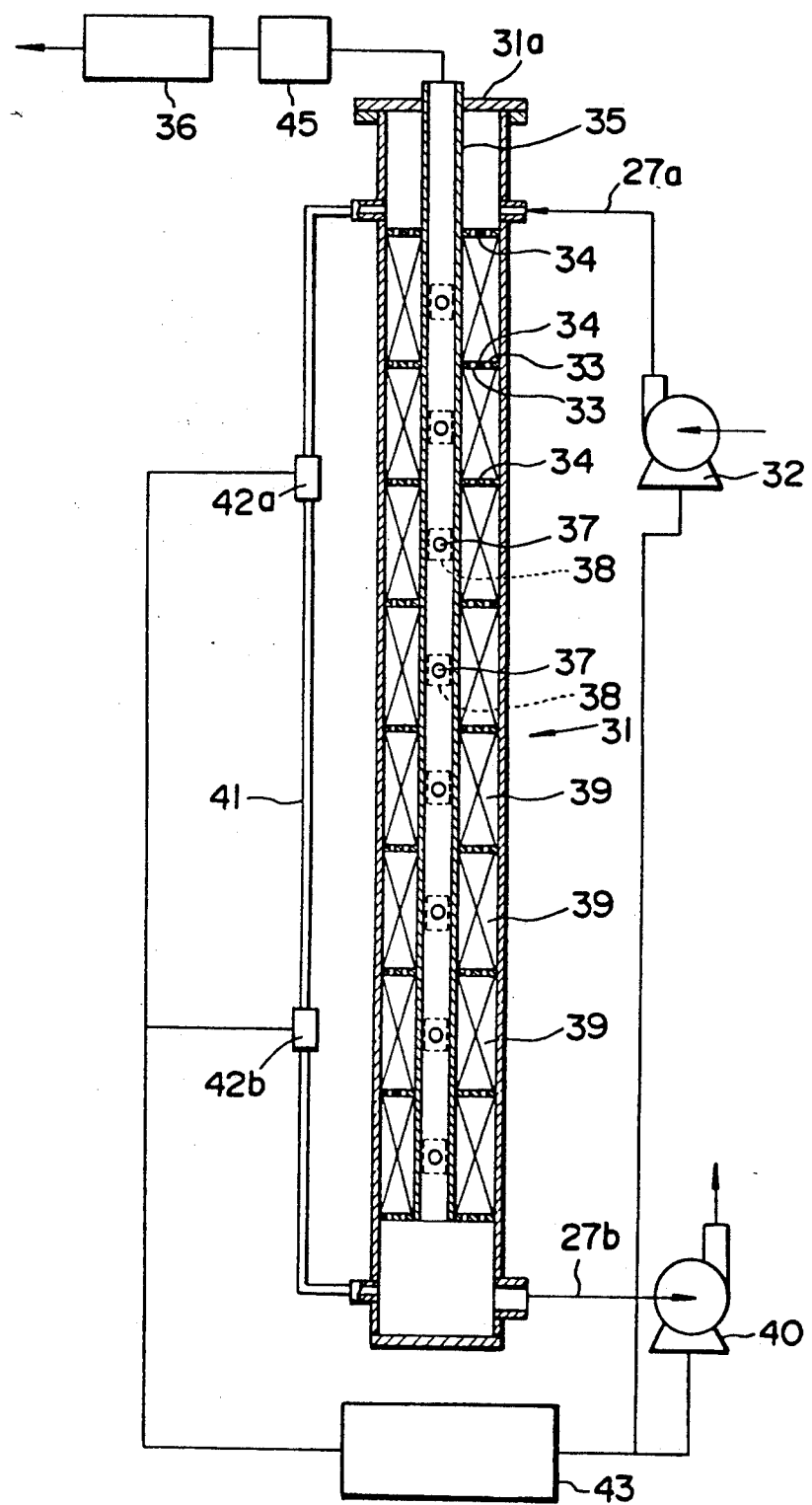
FIG. 6 is a cross-sectional view of a modification of the deaerating device of the ultrasonic cleaning apparatus shown in FIG. 2.

FIG. 6 shows a modification of the deaerating device 28.

In FIG. 6, a debubbling tank 45 is connected between the discharge pipe 35 in the sealed tank 31 and the ejector 36. The debubbling tank 45 houses a silicone-base solid debubblizer (UNFALL MT-9, manufactured by Daiichi Seiyaku Co., Ltd.) which is shaped so as not to obstruct the passage of a gas through the debubbling tank 45. Even if bubbles produced when the dissolved gas is released from the cleaning solution 24 are drawn from the discharge pipe 35 toward the ejector 36, they are eliminated by contact with the solid debubblizer in the debubbling tank 45, and hence prevented from being drawn into the ejector 36. The ultrasonic vibrator 44 shown in FIG. 3 may be dispensed with, but may also be disposed in the upper space in the sealed tank 31 if desired. The other structural details of the modified deaerating device shown in FIG. 6 are the same as the deaerating device 28 shown in FIG. 3.

Although certain preferred embodiments of the present invention have been shown and described in detail, it should be understood that various changes and modifications may be made therein without departing from the scope of the appended claims.

What is claimed is:

1. An apparatus for ultrasonically cleaning a workpiece, comprising:
   a cleaning tank for storing a cleaning solution therein, said cleaning tank having an ultrasonic vibrator disposed on a bottom thereof for radiating ultrasonic energy into the cleaning solution to remove foreign matter or burrs off a workpiece immersed in the cleaning solution; and
   deaerating means connected to said cleaning tank for supplying a deaerated cleaning solution to said cleaning tank, said deaerating means comprising a sealed tank supplied with the cleaning solution from said cleaning tank, and evacuating means for evacuating said sealed tank to release a dissolved gas from the cleaning solution supplied to said sealed tank and exposed to an evacuated space in said sealed tank;
   wherein said evacuating means includes a discharge pipe extending vertically in said sealed tank and having a plurality of holes defined in a wall thereof, and means disposed outside of said sealed tank and connected to said discharge pipe, for discharging air from said sealed tank, said discharge pipe having means for preventing the cleaning solution from being drawn into said discharge pipe through said holes.

2. An apparatus according to claim 1, wherein said deaerating means includes means for introducing the cleaning solution downwardly into said sealed tank from an upper portion thereof, whereby the cleaning solution is exposed to the evacuated space in said sealed tank while flowing downwardly through said sealed tank.

3. An apparatus according to claim 2, wherein said evacuating means includes contact surface means disposed in said sealed tank for impeding a flow of the cleaning solution which is introduced downwardly into said sealed tank, thereby causing the solution to flow over contact surfaces and increasing an area over which the cleaning solution is exposed to the evacuated space in said sealed tank.

4. An apparatus according to claim 3, wherein said contact surface means comprises a plurality of vertically spaced partitions dividing the space in the sealed tank into a plurality of chambers, each of said partitions having a plurality of small holes.

5. An apparatus according to claim 3, wherein said contact surface means comprises a filler for allowing the cleaning solution to flow on a surface thereof.

6. An apparatus according to claim 3, wherein said contact surface means comprises a plurality of vertically spaced partitions dividing the space in the sealed tank into a plurality of chambers, each of said partitions having a plurality of small holes, and a filler disposed in said chambers for allowing the cleaning solution to flow on a surface thereof.

7. An apparatus according to claim 1, wherein said evacuating means comprises means for discharging air from said sealed tank to evacuate the sealed tank.

8. An apparatus according claim 7, wherein said deaerating means includes debubbling means for eliminating bubbles produced in said sealed tank when the dissolved gas is released from said cleaning solution, said debubbling means being connected between said sealed tank and said means for discharging air.

9. An apparatus according to claim 1, wherein said means for preventing the cleaning solution from being drawn into said discharge pipe comprises covers attached to said discharge pipe in overhanging relationship to said holes, respectively.

10. An apparatus according to claim 1, wherein said cleaning tank has an outlet port for discharging the cleaning solution from the cleaning tank and an inlet port for supplying the cleaning solution into the cleaning tank, further including circulating means for circulating the cleaning solution from said outlet port to said inlet port, said deaerating means being connected in said circulating means.

* * * * *